United States Patent
Huckstedt et al.

[15] 3,669,883
[45] June 13, 1972

[54] FOAM FLOTATION SEPARATION SYSTEM PARTICULARLY SUITABLE FOR SEPARATING DISSOLVED PROTEIN COMPOUNDS AND TOXIC METALLIC IONS FROM AQUARIUM WATER

[72] Inventors: Guido Huckstedt, Prinzenweg 22a, 813 Starnberg; Norbert Tunze, Amselstrabe 14, 8011 Neukerferloh near Munich, both of Germany

[22] Filed: Aug. 21, 1970

[21] Appl. No.: 66,073

Related U.S. Application Data

[63] Continuation-in-part of Ser. No. 793,038, Jan. 22, 1969, abandoned.

[52] U.S. Cl. ............................210/44, 210/169, 210/221, 210/512
[51] Int. Cl. .........................................................B03d 1/00
[58] Field of Search ............210/44, 169, 221; 261/76, 77; 209/170

[56] References Cited

UNITED STATES PATENTS

| | | | |
|---|---|---|---|
| 2,518,814 | 8/1950 | Penten | 210/44 |
| 3,117,082 | 1/1964 | Schluter | 210/221 |
| 3,314,880 | 4/1967 | Rubin | 210/44 |

FOREIGN PATENTS OR APPLICATIONS

| | | | |
|---|---|---|---|
| 62,014 | 2/1940 | Norway | 210/169 |

OTHER PUBLICATIONS

Breder, C. M., Jr., et al., Zoologica, Vol. IX, No. 11, Jan. 28, 1931, pp. 404, 405 and 430

*Primary Examiner*—Michael Rogers
*Attorney*—Ernest S. Cohen and M. Howard Silverstein

[57] ABSTRACT

Foam flotation separation of dispersoids such as colloids and high molecular weight compounds in dispersions is carried out by drawing the dispersion into a pump which then passes it, as motive fluid, through a venturi to draw in air and effect an air emulsion-type mixture. Thereafter, the mixture passes into a separation column wherein the very small air bubbles in the emulsion are allowed to pass out of the liquid. During the passage through the liquid, dispersoid molecules are adsorbed, in the prior art manner, by the small bubbles, which results in the formation of a dispersoid-containing foam that is removed from the top of the separation column. A substantially dispersoid-free liquid is withdrawn from the lower section of the column. Particularly, the level of toxic compounds in aquarium water is effectively controlled by removing dissolved proteinaceous compounds from the water in this manner.

3 Claims, 4 Drawing Figures

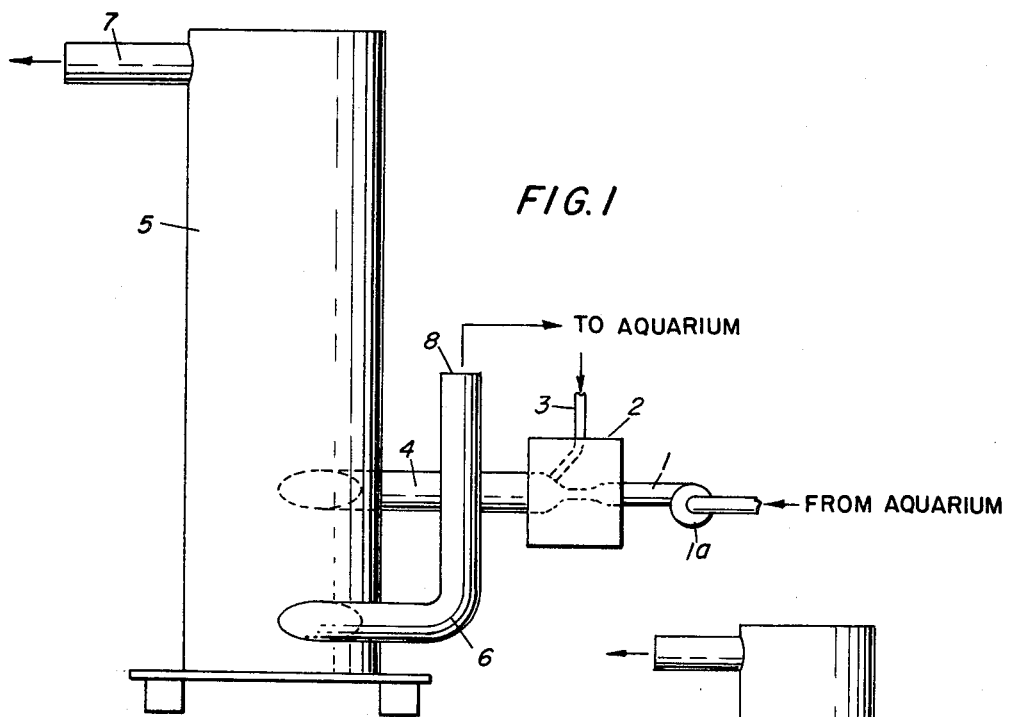
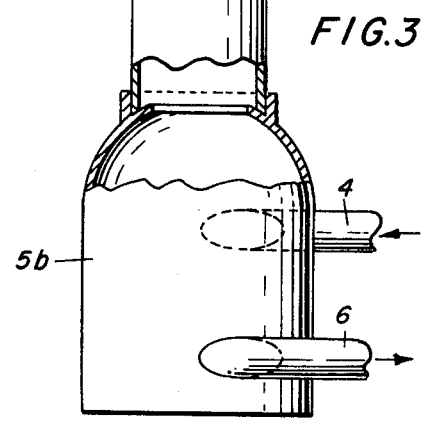
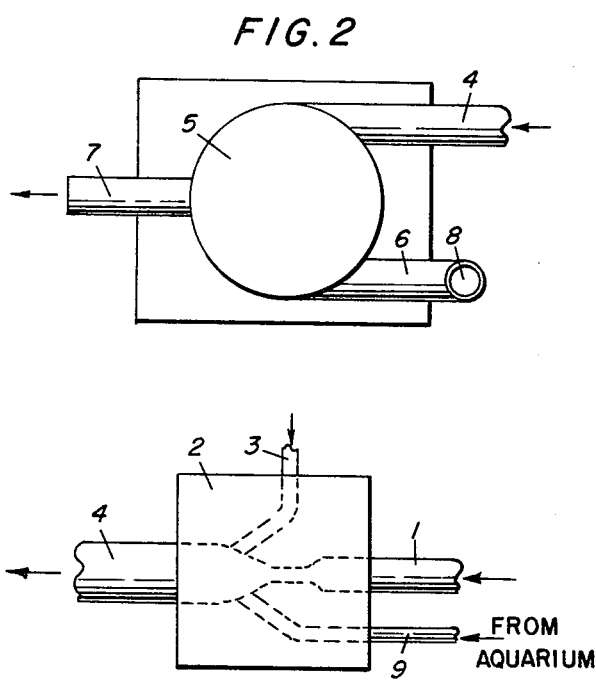
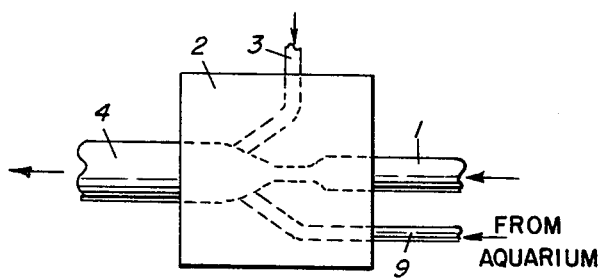

FOAM FLOTATION SEPARATION SYSTEM PARTICULARLY SUITABLE FOR SEPARATING DISSOLVED PROTEIN COMPOUNDS AND TOXIC METALLIC IONS FROM AQUARIUM WATER

This application is a continuation-in-part of application, Ser. No. 793,038 filed Jan. 22, 1969, which is hereby abandoned.

This invention relates to a new foam flotation separation technique and a system for maintaining a normal aquatic environment for captive aquatic life (fish in the broad sense, plants, etc.).

In the care of captive aquatic life in aquariums which are maintained for viewing by the public, by the private aquarist, or by the aquatic research scientist, it is the main object to maintain the captive life in a state of health approximating that which the species would have enjoyed in a normal existence outside captivity. As such, the population density of life is maintained as low as practicably possible. For example, in the case of fish, the population density usually is about 1 pound or less of fish per 100 gallons of water. In such an aquarium environment, during life cycle processes, dissolved proteinaceous compounds form from many sources including leftover food, aquatic life wastes, and decaying plants and animals. Environmental bacteria then break down these compounds into ammonia which is converted to nitrates and nitrites by other bacteria. All these latter compounds ($NH_3$, nitrates, nitrites) eventually reach levels which will destroy the aquatic life unless steps are taken to control their level. Furthermore, tap water employed for the aquatic environment may contain toxic metallic ions, or such ions may form therein by the leaching action of the water on the metal framework of the aquarium housing.

Heretofore, mechanical filters such as glass wool or diatomaceous earth have been employed to control the level of toxic compounds in aquariums, but these devices suffer from the disadvantage of being unable to remove dissolved compounds. Biological separators such as sand and gravel filters have also been employed, but these units are disadvantageous because (a) they are too large and inefficient, (b) they only convert ammonia to less toxic forms and do not remove it, (c) their function is dependent on a bacterial growth which is easily destroyed, (d) they do not begin to function until the bacterial population has developed within the filter, which takes 20 to 30 days, and (e) they inevitably cause stoppage of water flow which necessitates removing and/or cleaning of the sand or gravel.

We have now discovered that the level of toxic compounds in aquarium water can be effectively controlled by foam removal of dissolved protein compounds from the water. Furthermore, we have discovered a new foam flotation separation system for removing dispersoids (such as colloids and soluble high molecular weight compounds) from dispersions wherein the dispersion is first drawn through a pump, and then passed, as motive fluid, through a venturi to draw in a gas and effect a gas emulsion-type mixture. Next, the mixture is passed into a separating column in which the gas passes through the liquid as very small bubbles and adsorbs dispersoid molecules to ultimately form a dispersoid-containing foam at the top of the column, thereby leaving behind a dispersoid-depleted liquid. As used throughout the specification and claims, the term "dispersion" means solution, emulsions and colloidal dispersions. When this system is employed to treat aquarium water, it not only prevents the build-up of protein in the aquarium but it also supplies the aquarium's aeration needs and thereby eliminates the use of prior art aquarium aerators.

It is therefore an object of this invention to remove the main source of toxic compounds (ammonia, nitrates and nitrites) from aquarium water to prevent the formation of these compounds.

Another object is to provide a system for removing dissolved protein compounds and toxic metallic ions from aquarium water.

A further object is to maintain an environment for aquatic life in which the life can remain physically, physiologically and behaviorally normal.

A still further object is to provide an aquarium water treating system that begins operating immediately.

Yet another object is the elimination of prior art aquarium aerators.

A still further object is to provide an improved foam separation system for removing proteins, colloids and soluble high molecular weight compounds from liquid dispersions.

Other objects will be obvious from the detailed description of the system appearing in the specification in conjunction with the drawings in which:

FIG. 1 shows a side view of an apparatus for carrying out removal of the dissolved protein compounds and toxic metallic ions.

FIG. 2 is a fragmentary top view of the apparatus shown in FIG. 1.

FIG. 3 is a fragmentary side view of a modification of FIG. 1.

FIG. 4 is a side view of a modification of the air-liquid mixing device of FIG. 1.

Referring to FIG. 1, numeral 1 designates a conduit through which protein compound-containing water from an aquarium is passed by means of a pump 1a into a venturi chamber 2. As the water passes through the venturi, it draws in air from the atmosphere by means of conduit 3 and forms an emulsion-type mixture of very small air bubbles in the water entering tube 4.

As can be seen from FIGS. 1 and 2, the air-water mixture in conduit 4 is tangentially injected, at the periphery, into the lower section of a substantially vertically oriented, hollow column or chamber 5. At least this lower section of the column is substantially cylindrically shaped. As a result of the tangential injection, the mixture passes through a vortical path as it moves downward towards the column bottom, which causes heavier fluid, consisting of water substantially free of protein, to be centrifugally forced to the column sides. This fluid tangentially discharges from the periphery of the bottom of column 5 through conduit 6 to be delivered back to the aquarium. To induce a working head of water within the column which enables the system to work at maximum efficiency, exit opening 8 of conduit 6 is sufficiently higher than the bottom of column 5.

Meanwhile, the lighter air bubble phase which forms in the lower central area of column 5 rises into the upper section of the column and separates by gravity into (1) a heavy fluid phase mainly composed of additional water substantially free of dissolved protein and (2) a light fluid phase resembling a mucous-like foam composed of air, water and proteinaceous matter. This foam subsequently rises to the top of column 5 and discharges through conduit 7 into a suitable container (not shown), while the separated water settles towards the column bottom.

Separation chamber or zone 5 need not be designed for centrifugal separation. That is, even in a chamber wherein centrifugal force is not employed, the very small air bubbles in the emulsion-type mixture entering from conduit 4 will soon rise up through the water, adsorb dissolved protein, and appear as a cohesive froth at the top of the column in the prior art foam flotation manner as exemplified by British Pat. No. 955,321 or U.S. Pat. No. 1,251,621. In flotation separation a difference in pH and electrical potential exists along the length of the path of the air bubbles through the surrounding liquid medium, which potential difference effects adsorption of dissolved molecules in the liquid medium. One theory advanced in explanation of this attraction phenomena is that negative ions from any salts in the water or other liquid medium being treated form a platelet around each air bubble whereby positively charged molecules such as dissolved protein molecules are adsorbed on the bubbles.

Centrifugal force is preferably employed, however, because it results in a substantial increase in the rate of air-liquid separation per unit volume of the separation chamber.

Although not necessary or even important to the operation of the process of the present invention, centrifuging also results in the small air bubbles in the emulsion being concentrated together. Such concentration is unimportant because, as stated above, the small bubbles in the emulsion, even in a non-centrifugal type separation chamber will soon rise up through the chamber in an unconcentrated manner, attract dissolved protein, and form a cohesive froth at the top of the chamber.

What is necessary, however, is the location of the emulsion-producing venturi chamber 2 downstream from pump 1a. So far as is known, the proper size and quantity of air bubbles necessary to continuously adsorb substantially all the dissolved protein in the water, which protein-containing bubbles can then be separated out from the water in the separation column, can only be attained if the venturi is located on the discharge rather than feed side of pump 1a.

In addition to the removal of dissolved protein, toxic metallic ions present in the aquarium water being fed to the separation device of the present invention will be separated out by the device and removed in the foam phase discharging from the top of column 5. The exact mechanism by which the toxic metallic ions are removed through gas bubble contact has not, as yet, been determined.

The efficiency of the separation system of the present invention on aquarium water is directly proportional to the salinity of the aquarium water. Therefore, the amount of water that must be continuously or periodically pumped through the system depends upon the salinity of the water as well as the size of the apparatus and the population density of the aquatic life. As an example, for normal population densities of most captive sea water aquatic life (marine life) in natural or substantially simulated sea water (having a saline content equivalent to 35 parts per thousand NaCl), it will usually be necessary to operate the pump 1a at a speed sufficient to pump the entire water contents of the aquarium through the treating apparatus about every hour. About 1 pound of fish or less per 100 gallons of water exemplifies such a normal population density in an aquarium.

Very low salinity aquatic environments can still be effectively treated by the system of the present invention by merely establishing more intimate contact between the water and bubbles to produce the negative ion platelet phenomena around each bubble. Narrower contact columns and higher fluid feed velocities bring about such intimate contact. For example, a diluted sea water having a saline content equivalent to 0.2 parts NaCl per thousand can be efficiently treated in a 3-inch diameter column under a fluid feed velocity of about 750 gph. In such a low salinity aquatic environment (0.2 parts per thousand NaCl), most fresh water aquatic life can be sustained.

Since most gases possess a charged surface at the gas-liquid interface of a very small bubble in a saline solution, other gases such as nitrogen or oxygen could be employed in place of air. However, their employment would obviously be considerably more expensive since it would require supplying an additional agent in pressurized form. Nonetheless, their use may be necessitated in smoky environments since charged particles in the air tend to neutralize the charge that would normally occur at the liquid-gas interface in saline solutions.

Other variables that can effect process efficiency are the water temperature and the size of the gas venturi in the venturi chamber (e.g., FIG. 1, reference numeral 2). As will be apparent to those skilled in the art, such variables should be experimentally determined for optimization of each specific operation. Generally speaking with regard to aquarium water treatment, efficiency increases with increasing water temperature, and excellent results can be attained with venturis having diameters of 1–10 mm with pumps which deliver water at 100 to 1,000 gph. Other venturi sizes can obviously be used depending upon such variables as pump pressure and volume, venturi shape, and the size of the separation chamber.

As shown in FIG. 3, the apparatus employed in the practice of the invention can be readily modified. Referring to the figure, column 5 is shown constructed of two pieces, foam column 5a and vortex chamber 5b. This arrangement facilitates cleaning and repairing. More than two separate components could be employed if desired.

Another modification is shown in FIG. 4 wherein greater contact between air and water is effected by modifying venturi chamber 2 to include an additional conduit 9 connected between the aquarium and the venturi. When aquarium water is pumped through conduit 1, it will thereby draw in more aquarium water through conduit 9 as well as air through conduit 3. Turbulence created by this additional water stream contributes towards further mixing between air and water.

The following test shows the effectiveness of the system of the present invention:

A 4,000 gallon aquarium containing simulated sea water and about 1 pound of fish/100 gallons of water was connected via a pump and venturi chamber (similar to that shown in FIG. 4) to an apparatus substantially the same as that shown in FIG. 3. The overall height of the contact column was about 3 feet, while the diameter of the vortex chamber section of the column was about 10 inches. About 500 gph of aquarium water were continuously pumped through the venturi chamber drawing in 6,000 liters per hour of air and 250 gph of additional aquarium water. The discharge conduit for the treated water terminated about 1 foot above the bottom of the column. Aquarium water was periodically analyzed and the following results were obtained:

| | Composition of Water | | | |
|---|---|---|---|---|
| Toxic Components | At start | After 1 day | After 2 days | After 3 days |
| ammonia | .15 ppm | .07 | .02 | trace |
| nitrates | 15 ppm | 14 | 14 | 16 |
| nitrites | 7 | 8 | 8 | 7 |

As can be seen from this data, the toxic nitrates and nitrites did not increase in concentration over a period of a few days which factor was due to the almost complete prevention of ammonia formation. In fact, in tests to date fish have been maintained in a normal state of health for almost 3 years with no build-up of these toxic compounds to toxic levels.

Redox potential of water is another measure of the effectiveness of the present invention. That is, the addition of proteinaceous matter such as food to water markedly lowers the redox potential which remains lowered until the protein content dissipates or is otherwise removed. On this basis the system of the present invention was compared with a sand gravel filter as follows:

A quantity of water was treated with a predetermined amount of proteinaceous matter in the form of food. Half of the treated water was passed through the apparatus of the present invention while the other half was passed through a sand gravel filter, which filter was operated under predetermined optimum conditions. The redox potential of the discharge water from each of the two systems was periodically taken, and the following results were obtained: The redox potential of the water passing through the apparatus of the present invention increased 30 mv in 1 hour while the redox potential of the sand gravel-treated water was restored at a rate of 20 mv in ten hours. These results show the superiority of the system of the present invention over sand gravel filters with regard to proteinaceous matter removal.

As previously indicated, an additional advantage of the present invention is the fact that the foam flotation separation system also eliminates the need for aerating the aquarium water in the prior art manner. The air-water contact brought about by the venturi effect and subsequent contact between water and small air bubbles in the separation zone are sufficient to supply the entire aeration needs of the aquarium.

Historically, research on normal marine organisms has only been possible at seaside laboratories, or at those inland laboratories where, at the expense of considerable space and sums of money, biological filters for converting ammonia to less toxic nitrogenous compounds have been installed. Eventually, at such inland laboratories these compounds also reached toxic levels and the sea water had to be replaced, the net result being that a normal marine environment was virtually unattainable, and the organisms therefore were not normal. By the system of the present invention, marine life can now be maintained anywhere in such a condition as to make them suitable for research purposes. Furthermore, the system will be of value to private and public aquarists who are interested in maintaining captive aquatic organisms in a state of health comparable to that enjoyed before capture.

Although the system has been described as being external to the aquarium, as will be apparent to those skilled in the art, in many instances the system could be installed within the aquarium.

Foam separation techniques have previously been employed to remove proteins from liquid medium (other than aquarium water) and to remove other dispersoids such as virus, vitamins, fatty acids, water-soluble high molecular weight compounds, lanolin, etc. from liquid dispersions. Prior techniques are exemplified by British Pat. No. 955,321 and U.S. Pat. Nos. 1,251,621, 1,505,944, 2,162,379, and 2,313,007. In comparison to such systems, the present invention offers an improved way to carry out foam separations.

We claim:

1. In a process for preventing ammonia and nitrates and nitrites derived from said ammonia from reaching toxic levels with regard to captive fish life maintained in a saline aquatic environment normal to said life, in which said fish are present in an amount of about one pound of fish or less per 100 gallons of water, the improvement comprising removing from said environment dissolved protein compounds which would otherwise decompose in said environment into said ammonia and then into said nitrates and nitrites, said protein compounds being removed to such a degree that said ammonia, nitrates and nitrites are continuously maintained at levels below said toxic levels; said step of removal comprising a. passing saline water from said environment through a pump;
    b. passing said saline water from said pump through a venturi, as motive fluid, to draw air into said water and form an air emulsion-type mixture;
    c. passing said emulsion-type mixture into a separation zone to allow small bubbles of said air in said mixture to (i) pass through said saline water, (ii) adsorb dissolved protein compounds, and (iii) thereafter collect as a cohesive froth above protein compound-depleted water;
    d. separating said froth from said protein-depleted water;
    e. returning said protein-depleted water to said environment;

wherein said saline water is passed through said separation zone at a rate sufficient to remove said dissolved protein compounds to the degree that said ammonia, nitrates and nitrites will be maintained below said toxic levels for at least a year; and wherein said air which is drawn in by said venturi is essentially the only air which is injected into said saline aquatic environment.

2. The process of claim 1 wherein said separation zone comprises a centrifugal separation zone.

3. The process of claim 2 wherein said saline aquatic environment includes dissolved metallic ions which are toxic to said fish and which are removed in said centrifugal separation zone.

* * * * *